Patented Dec. 2, 1952

2,620,328

UNITED STATES PATENT OFFICE 2,620,328

BETA, N,N-DISUBSTITUTED AMINOMERCAPTANS AS MODIFIERS IN EMULSION POLYMERIZATION

Harold R. Snyder, Urbana, Ill., and John M. Stewart, Missoula, Mont., assignors to Phillips Petroleum Company, a corporation of Delaware No Drawing. Application November 17, 1947, Serial No. 786,539

20 Claims. (Cl. 260—84.3)

1

This invention relates to the polymerization of unsaturated organic compounds capable of undergoing an addition polymerization to form long chain molecules or high polymers of the type known as synthetic rubber. In one of its most specific aspects it relates to the copolymerization of 1,3-butadiene and styrene. This invention also relates to the polymerization of an aliphatic conjugated diene hydrocarbon, including substituted derivatives, either alone or in admixture with other unsaturated monomeric compounds copolymerizable therewith. The invention is particularly useful for the polymerization of a 1,3-butadiene hydrocarbon and a monomer copolymerizable therewith in an aqueous dispersion.

It is well known that an aliphatic conjugated diene hydrocarbon may be polymerized to long chain high polymers or synthetic rubber-like materials having some of the characteristic properties of natural rubber. It is also known that when these conjugated diene hydrocarbons are subjected to polymerization conditions in the presence of any of a number of unsaturated organic compounds copolymers are formed. The polymerization is often carried out in an aqueous emulsion. The present invention is particularly applicable to the polymerization of an aliphatic conjugated diene hydrocarbon in an aqueous emulsion in the presence of an unsaturated organic compound copolymerizable therewith. The conjugated diene hydrocarbons which undergo this type polymerization reaction, i. e. addition of the monomer molecules to form long chain high polymers, are often termed 1,3-butadiene hydrocarbons. Of particular importance in synthetic rubber field are copolymers of an aliphatic conjugated diene hydrocarbon, particularly 1,3-butadiene, and a suitable comonomer. Butadiene may be polymerized with various known comonomers such as styrene, derivatives of styrene containing an active vinyl ($CH_2=C<$) group, acrylonitrile, methacrylonitrile, methyl acrylate, methyl methacrylate, and the like.

An object of this invention is to provide an improved process for the polymerization of unsaturated organic compounds to form high molecular weight polymers or synthetic rubbers.

Another object is to provide an improved process for the polymerization of a conjugated diene hydrocarbon and a monomer copolymerizable therewith.

Still another object is to provide an improved process for carrying out this type of polymerization in an aqueous emulsion.

2

Still another object is to provide improved promoter-modifier compounds for the polymerization reaction.

Other objects and advantages of the present invention will be apparent to those skilled in the art from the accompanying detailed disclosure.

In the production of synthetic rubber, polymerizable organic compounds are contacted in media and under conditions whereby polymers of rubber-like characteristics are obtained. The properties of the polymers produced, particularly as regards tack, cohesiveness, milling characteristics, and the like, are of primary importance in carrying out such processes. It is also requisite, from the economic viewpoint, that the reaction should proceed as rapidly as is possible without detrimental effects on the properties of the product. Modifiers and promoters, as employed in conventional polymerization procedures, are added in order to effect the desired conversion in a minimum reaction time and to produce polymers having desirable characteristics. The properties of the product are influenced by the action of modifiers which operate to eliminate or substantially reduce cross linkage between the polymer units, with consequent formation of gel-type products, and also serve to regulate the average molecular weight of the polymer, a factor which influences to a large extent the properties of the product. The rate of polymerization is governed by various factors but under fixed operating conditions is largely dependent upon the action of substances known as promoters.

In many instances, and particularly in the standard emulsion polymerization procedures employing a recipe of the type:

| | Parts |
|---|---|
| Butadiene | 75 |
| Styrene | 25 |
| Potassium persulfate | 0.3 |
| Soap | 5 |
| Water | 180 |
| Modifier | Variable | promoting and modifying effects are obtained concurrently by the employment of promoter-modifiers, usually comprising a primary or tertiary aliphatic mercaptan or blend of such mercaptans in the $C_8$ to $C_{16}$ range. Mercaptans of carbon content less than $C_8$ either enhance the polymerization rate very little, or actually inhibit or reduce this polymerization rate. Thus promoting and modifying in such reactions has heretofore been dependent upon the action of a relatively small number of compounds in which the only variables lie in the length and configuration of the hydrocarbon chain.

We have now found new promoter-modifiers for polymerization processes whereby additional variables in both promoting and modifying action are provided by the substitution of a second functional group near the active sulfhydryl group in an aliphatic or alicyclic mercaptan. Also, through the discoveries of this invention, it is possible to treat mercaptans of carbon content $C_7$ or less, normally valueless as promoters, so that they become exceedingly valuable for this purpose. The promoter-modifiers of our invention comprise mercaptans, preferably of not more than six carbon atoms in the mercaptan nucleus, in which the substituent group is a secondary amino group, containing not more than 24 carbon atoms, located in the beta position. These compounds may contain either primary, secondary, or tertiary mercapto groups and can be employed either alone or in compositions or blends as desired.

An important advantage of the present invention lies in the adaptability of our novel promoter-modifiers to varying conditions and requirements in polymerization processes. For example, by employing a mercaptan in which a secondary amino group is the substituent, increased solubility in the aqueous phase is provided in most instances, thereby facilitating the dispersion of the mercaptan to the reaction locus. While the versatile nature of our promoter-modifiers is apparent from a general viewpoint, such as that cited above, this advantage is especially evident among the individual compounds. Rubbers modified with beta-di-n-heptylamino ethyl mercaptan

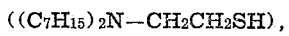

$((C_7H_{15})_2N-CH_2CH_2SH)$, for example, are appreciably stickier than those prepared by the conventional method, and at the same time display greater film strength. Beta-di-n-heptylamino tertiary butyl mercaptan

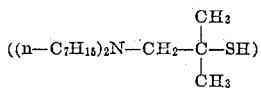

exerts very pronounced promoting and modifying effects when employed in quantities much less than those required when operating with conventional modifiers, such as primary dodecyl mercaptan.

The beta-substituted mercaptans of our invention may be prepared by the interaction of olefin sulfides with secondary amines according to the method disclosed in our copending application, Serial No. 747,123, filed May 9, 1947, of which this application is a continuation-in-part. This is now Patent 2,505,870, granted May 2, 1950. These compounds can be termed beta (N,N-disubstituted amino) alkyl and cycloalkyl mercaptans. In the preparation of these novel promoter-modifiers we have preferred to employ olefin sulfides containing not more than six carbon atoms to the molecule, such as ethylene sulfide, propylene sulfide, isobutylene sulfide, cyclohexene sulfide, and the like, although the use of sulfides containing a larger number of carbon atoms to the molecule is not beyond the scope of this disclosure. These olefin sulfides are reacted with secondary aliphatic amines in which the substituent groups contain less than twelve carbon atoms. The cyclic amines, piperidine and beta-pipecoline, when reacted with olefin sulfides, have also been found to produce compounds which have valuable promoting and modifying action in polymerization reactions.

The promoter-modifiers of our invention may be employed in various types of polymerization processes although we have preferred to operate with those systems in which the polymerization is carried out in aqueous emulsions, typified by the conventional GR–S procedure. Our beta-substituted amino mercaptans may be added to the reaction mixture by any conventional method, such as by incorporation of the entire amount required in the original reaction mixture, or by a small initial addition followed by increments supplied during the course of the reaction.

The following examples illustrate the use of various beta-substituted amino mercaptans as promoter-modifiers in accordance with our invention. While these examples illustrate particular embodiments of the present invention, they are not to be construed as limiting the invention in any way, but merely as illustrative of principles involved and the application of these materials.

*Example I*

Polymerization mixtures were prepared according to the following recipe:

| | Parts by weight |
|---|---|
| Butadiene | 75 |
| Styrene | 25 |
| Potassium persulfate | 0.3 |
| Promoter-modifier | variable |
| Soap | 5.0 |
| Water | 180 |

A series of three runs was made. In the first reactor a control test was made employing 0.5 part primary dodecyl mercaptan as the promoter-modifier while in the second and third runs the addition product of propylene sulfide with di-n-amylamine was used, the amounts being 0.29 and 0.57 parts respectively. The larger quantity of the addition compound employed is equivalent (in mols) to 0.5 part of the dodecyl mercaptan. The reactor contents were agitated for 12 hours at a temperature of 50° C. after which phenyl-beta-naphthylamine was added and the latex was coagulated with brine-acid solution, washed, and dried. The per cent conversion, benzene solubility, and intrinsic viscosity were determined on each sample. The polymers were gel free as indicated by their complete solubility in benzene. The table which follows shows the results obtained:

| Run No. | Promoter-Modifier Concentration, Parts | Conversion, Percent | Intrinsic Viscosity |
|---|---|---|---|
| 1 (control) | 0.5 | 81.5 | 1.76 |
| 2 | 0.29 | 79.0 | 1.77 |
| 3 | 0.57 | 78.5 | 2.00 |

*Example II*

Two trial runs were carried out using the recipe and following the procedure of Example I. The first, to which 0.5 part primary dodecyl mercaptan was added as the promotor-modifier, was used as the control. For the second test an amount of beta-di-n-amylamino ethyl mercaptan $((n-C_5H_{11})_2N-CH_2-CH_2SH)$ equivalent (in mols) to the dodecyl mercaptan employed, was added. Solubility of the polymers in benzene was substantially complete. The results are recorded below:

| Run No. | Promoter-Modifier Concentration, Parts | Conversion, Percent | Intrinsic Viscosity |
|---|---|---|---|
| 1 | 0.5 | 73.5 | 1.73 |
| 2 | 0.54 | 72.0 | 1.72 |

The polymer prepared using the beta-di-n-amylamino ethyl mercaptan was particularly desirable as regards tack and film strength in the raw material.

*Example III*

The use of N-(beta-pipecolino)-tert-butyl mercaptan as a promoter-modifier was determined by employing 0.21 and 0.43 parts, respectively, in the polymerization recipe of Example I. A parallel run was made using 0.5 part primary dodecyl mercaptan as a control. Experiments were carried out according to the procedure given in Example I. The results were as follows:

| Run No. | Promoter-Modifier Concentration, Parts | Conversion, Percent | Intrinsic Viscosity |
|---|---|---|---|
| 1 (Control) | 0.5 | 70.0 | 1.75 |
| 2 | 0.21 | 65.0 | 2.86 |
| 3 | 0.43 | 67.5 | 1.77 |

Solubility of the polymers in benzene was substantially complete.

*Example IV*

Several trial runs employing beta-di-n-octylamino ethyl mercaptan

$$((n-C_8H_{17})_2N-CH_2-CH_2SH)$$

in the recipe of Example I were carried out to study its effect as a promoter-modifier in polymerization reactions. The procedure of Example I was followed and a control run using 0.5 part primary dodecyl mercaptan was made. The following table shows the materials used and the results obtained:

| Promoter-Modifier | Concentration of Promoter-Modifier | Conversion, Percent | Intrinsic Viscosity |
|---|---|---|---|
| Primary dodecyl mercaptan | Parts 0.5 | 83 | 1.85 |
| Beta-di-n-octylamino ethyl mercaptan | 0.38 | 80 | 2.48 |
| Beta-di-n-octylamino ethyl mercaptan | 0.75 | 79.5 | 1.74 |
| Beta-di-n-octylamino ethyl mercaptan | 0.97 | 79 | 1.50 |

Of the amounts of beta-di-n-octylamino ethyl mercaptan used, 0.75 part is equivalent to 0.5 part primary dodecyl mercaptan. The polymers were substantially gel free.

*Example V*

Tests on polymers prepared as in the previous examples but employing beta-di-n-heptylamino tertiary butyl mercaptan

$$((n-C_7H_{15})_2N-CH_2-C(CH_3)_2SH)$$

as promoter-modifier gave the following results:

| Promoter-Modifier | Concentration of Promoter-Modifier | Conversion, Percent | Intrinsic Viscosity |
|---|---|---|---|
| Primary dodecyl mercaptan (control) | Parts 0.5 | 69.1 | 1.60 |
| Beta-di-n-heptylamino tert-butyl mercaptan | 0.38 | 63.0 | 1.53 |
| Beta-di-n-heptylamino tert-butyl mercaptan | 0.75 | 65.0 | 2.03 |

The larger quantity of beta-di-n-heptylamino tertiary butyl mercaptan employed is equivalent to 0.5 part primary dodecyl mercaptan. Substantially gel free polymers were obtained in each case.

*Example VI*

An amount of beta-di-n-butylamino-tert-butyl mercaptan $((n-C_4H_9)_2N-CH_2-C(CH_3)_2SH)$ (0.54 part) equivalent to 0.5 part primary dodecyl mercaptan was employed in the polymerization recipe given in Example I. The same procedure was followed for effecting the reaction. At the end of a twelve-hour reaction period the conversion had reached 74.0 per cent. A benzene soluble polymer with an intrinsic viscosity of 2.14 was obtained. The usual control was run and a conversion of 81.5 per cent was realized.

The use of a beta-substituted mercaptan as a promoter-modifier in accordance with this invention may be applied to the polymerization of conjugated diene hydrocarbons. It is particularly useful for the copolymerization of a conjugated diene hydrocarbon and at least one other unsaturated compound copolymerizable with the diene. Suitable diene hydrocarbons include 1,3-butadiene, isoprene, 2,3-dimethyl butadiene, piperylene, and the like. Compounds copolymerizable with conjugated diene hydrocarbons contain an active vinyl ($CH_2=C<$) group and comprise aryl olefins (e. g. styrene, p-chloro styrene, p-methoxy styrene, vinyl naphthalene, etc.); vinyl furan, vinyl pyridine, vinyl thiophene, vinyl quinoline, and the like; alkyl esters of acrylic acid (e. g. methyl acrylate, ethyl acrylate, butyl acrylate, etc.); esters of substituted acrylates (e. g., methyl methacrylate, ethyl methacrylate, butyl methacrylate, methyl ethacrylate, etc.); nitriles of acrylic acids (e. g. acrylonitrile, methacrylonitrile, etc.); vinylidine chloride; vinyl ketones (e. g. methyl vinyl ketone); vinyl ethers (e. g. methyl vinyl ether); vinyl carbazole; and other unsaturated compounds. The present invention is especially useful for the copolymerization of a conjugated diolefin containing from four to six carbon atoms and a comonomer, such as styrene, acrylonitrile, methyl acrylate, and methyl methacrylate. Those conjugated diolefins which are especially useful are 1,3-butadiene, isoprene, and equivalents, for example, chloroprene.

We claim:

1. In the production of synthetic rubber by polymerization in an aqueous emulsion of a mixture of a major amount of 1,3-butadiene and a minor amount of styrene in the presence of a catalyst, the improvement which comprises conducting said polymerization in the presence of a promoter-modifier which comprises a mercaptan of the group consisting of beta (N,N-disubstituted amino) alkyl and cycloalkyl mercaptans having at least two and not more than six carbon atoms in said mercaptan nucleus and in which said (N,N-disubstituted amino) group is selected from the group consisting of N,N-dialkyl groups, having a total of not more than twenty-four carbon atoms, piperidino and pipecolino groups.

2. The process of claim 5 in which said beta-substituted mercaptan is $(n-C_5H_{11})_2N-CH_2-CH_2SH.$ 3. The process of claim 5 in which said beta-substituted mercaptan is N-(beta-pipecolino)-tert-butyl mercaptan.

4. The process of claim 5 in which said beta-substituted mercaptan is $(n-C_7H_{15})_2N-CH_2C(CH_3)_2SH$ 5. In polymerizing in an aqueous emulsion an unsaturated organic compound containing a $CH_2=C<$ group and which undergoes an addition polymerization to form a linear polymer of high molecular weight, the improvement which comprises conducting said polymerization in the presence of a promoter-modifier which comprises a mercaptan of the group consisting of beta (N,N-disubstituted amino) alkyl and cycloalkyl mercaptans having at least two and not more than six carbon atoms in said mercaptan nucleus and in which said (N,N-disubstituted amino) group is selected from the group consisting of N,N-dialkyl groups, having a total of not more than twenty-four carbon atoms, piperidino and pipecolino groups.

6. In the production of synthetic rubber by polymerization in an aqueous emulsion of a mixture of a major amount of 1,3-butadiene and a minor amount of styrene in the presence of an emulsion polymerization catalyst and an emulsifier, the improvement which comprises conducting said polymerization in the presence of a promoter-modifier which comprises a beta (N,N-disubstituted amino) tertiary butyl mercaptan in which said (N,N-disubstituted amino) group is selected from the group consisting of N,N-dialkyl groups, having a total of not more than twenty-four carbon atoms, piperidino and pipecolino groups.

7. The process of claim 6 in which said amino mercaptan is $(n-C_7H_{15})_2N-CH_2C(CH_3)_2SH.$ 8. The process of claim 6 in which said amino mercaptan is N-(beta-pipecolino)-tert-butyl mercaptan.

9. In the production of synthetic rubber by polymerization in an aqueous emulsion of a mixture of a major amount of 1,3-butadiene and a minor amount of styrene in the presence of an emulsion polymerization catalyst and an emulsifier, the improvement which comprises conducting said polymerization in the presence of a promoter-modifier which comprises $(n-C_5H_{11})_2N-CH_2CH_2SH$ 10. A process for the polymerization of a monomeric material comprising a major proportion of a conjugated diene, which comprises polymerizing said monomeric material while in an aqueous dispersion in the presence of a polymerization catalyst and an emulsifier and a promoter-modifier which comprises a mercaptan of the group consisting of beta (N,N-disubstituted amino) alkyl and cycloalkyl mercaptans having at least two and not more than six carbon atoms in said mercaptan nucleus and in which said (N,N-disubstituted amino) group is selected from the group consisting of N,N-dialkyl groups, having a total of not more than twenty-four carbon atoms, piperidino and pipecolino groups.

11. The process of claim 10 in which said beta-substituted mercaptan is $(n-C_5H_{11})_2N-CH_2-CH_2SH$ 12. The process of claim 10 in which said beta-substituted mercaptan is N-(beta-pipecolino)-tert-butyl mercaptan.

13. The process of claim 10 in which said beta-substituted mercaptan is $(n-C_7H_{15})_2N-CH_2C(CH_3)_2SH$ 14. The process of claim 10 in which said beta-substituted mercaptan is a beta di-n-amylamino propyl mercaptan.

15. The process of claim 10 in which said beta-substituted mercaptan is beta di-n-octylamino ethyl mercaptan.

16. The process of claim 1 in which said beta-substituted mercaptan is $(n-C_5H_{11})_2N-CH_2-CH_2SH$ 17. The process of claim 1 in which said beta-substituted mercaptan is N-(beta-pipecolino)-tert-butyl mercaptan.

18. The process of claim 1 in which said beta-substituted mercaptan is $(n-C_7H_{15})_2N-CH_2C(CH_3)_2SH$ 19. The process of claim 1 in which said beta-substituted mercaptan is a beta di-n-amylamino propyl mercaptan.

20. The process of claim 1 in which said beta-substituted mercaptan is beta di-n-octylamino ethyl mercaptan.

HAROLD R. SNYDER.
JOHN M. STEWART.

REFERENCES CITED

The following references are of record in the file of this patent:

UNITED STATES PATENTS

| Number | Name | Date |
|---|---|---|
| 2,380,475 | Stewart | July 31, 1945 |
| 2,380,905 | Stewart | July 31, 1945 |

OTHER REFERENCES

Kolthoff et al., J. Polymer Sci., 2, 41–71, February 1947 (Copy in Div. 50).

Harris et al., J. Polymer Sci., 2, 82–89, February 1947 (Copy in Div. 50).